United States Patent [19]

Feibush

[11] Patent Number: 5,137,627
[45] Date of Patent: Aug. 11, 1992

[54] DEACTIVATED SUPPORTS FOR LIQUID CHROMATOGRAPHIC SEPARATION OF SILANOPHILES

[75] Inventor: Binyamin Feibush, State College, Pa.

[73] Assignee: Supelco, Inc., Bellefonte, Pa.

[21] Appl. No.: 522,491

[22] Filed: May 10, 1990

Related U.S. Application Data

[62] Division of Ser. No. 318,021, Mar. 2, 1989, abandoned.

[51] Int. Cl.$^5$ ............................................. B01D 15/08
[52] U.S. Cl. ........................... 210/198.2; 210/502.1; 210/635; 210/656; 502/401; 502/402; 502/439
[58] Field of Search ............... 210/635, 656, 198.2, 210/502.1; 502/401, 402, 407, 439; 530/413

[56] References Cited

U.S. PATENT DOCUMENTS

| | | | |
|---|---|---|---|
| 3,917,527 | 11/1975 | Shaltiel | 210/635 |
| 3,960,720 | 6/1976 | Porath | 210/635 |
| 4,177,038 | 12/1979 | Biebricher | 210/635 |
| 4,196,208 | 4/1980 | Shephard | 424/263 |
| 4,322,310 | 3/1982 | House | 210/635 |
| 4,421,650 | 12/1963 | Nagasawa | 210/635 |
| 4,540,486 | 9/1985 | Ramsden | 210/198.2 |
| 4,551,245 | 11/1985 | Ramsden | 210/502.1 |
| 4,604,207 | 8/1986 | Oi | 210/635 |
| 4,705,725 | 11/1987 | Glajch | 55/67 |
| 4,764,601 | 8/1988 | Reuning | 210/198.2 |
| 4,919,804 | 4/1990 | Dorsey | 210/198.2 |

OTHER PUBLICATIONS

Gisch, "Shielded Hydrophobic Phase", Journal of Chromatography, 433, 1988, pp. 264–268.
Nomura, "Acylation of Aminopropyl Bonded Silica Gel for Liquid Chromatography, Analytical Sciences", vol. 3, Jun. 1987, pp. 209–212.
Snyder, Introduction to Modern Liquid Chromatography, John Wiley & Sons, Inc., New York, 1979, pp. 272–280.

Primary Examiner—Ernest G. Therkorn
Attorney, Agent, or Firm—John E. Taylor, III

[57] ABSTRACT

Silica gel chromatographic supports surface-modified with $(R^1O)_{3-m}Si\ R^2_m(CH_2)_3NH(CH_2CH_2NH)_nH$, in which $R^1$ is a $C_1$–$C_5$ alkyl, $R^2$ is methyl or ethyl, and m and n are independently selected from the integers 0, 1 or 2, and further modified chemically to produce reverse-phase character, markedly reduce the interaction between silanophilic analytes and the silanol groups present on the surface of the silica gel through the presence of polar groups, which include the residual unmodified amino and modified amino groups, and which are densely packed near the silica surface. This results in chromatographic elution of basic, silanophilic analytes in efficient, narrow bands similar to those of the less-polar analytes.

7 Claims, 3 Drawing Sheets

DEACTIVATED SUPPORTS FOR LIQUID CHROMATOGRAPHIC SEPARATION OF SILANOPHILES

This application is a division, of application Ser. No. 318,021, filed Mar. 2, 1989, now abandoned.

This invention relates to separation materials for liquid chromatography, and more particularly to reverse-phase chromatographic packings having lipophilic ligands bonded to a silanized silica surface.

BACKGROUND OF THE INVENTION

Silica gel has unique properties which make it highly useful as a chromatographic support, and particularly applicable as a support for high-pressure liquid chromatography (HPLC). In the majority of its HPLC analytical applications, the material is used as a base for reversed-phase packing, which are used in a chromatographic mode in which aqueous organic solutions pass through a silica gel packing which has been modified by an alkylated silanizing agent, e.g. dimethyloctadecylchlorosilane. Even though the silanizing techniques and the silanizing materials themselves are similar, the resulting reversed-phase packings show a great variation in selectivity for various analytes, and particularly for silanophilic analytes. This variation results from the physical and chemical nature of the silica gel itself, and particularly variations in silica gels produced by different manufacturers.

Silica gel is the polymeric form of silicic acid, $Si(OH)_4$, in which siloxane bonds are formed between neighboring silicon atoms by eliminating water molecules. Wherever a break in the polymer structure occurs, including at the surface, a silanol group (Si—OH) is present. The surface density of silanol groups on the available HPLC silica gels is about $4.8 \text{ nm}^{-2}$ or $8 \mu \text{mole}/m^2$. These silanol groups react with monofunctional silylating reagents having the general formula $XSi(CH_3)_2R$, in which X is a good leaving group and R is a normal alkyl chain for most reverse-phase materials. Even with the most aggressive silanization reactions no more than half of the silanol groups can be converted to the alkyldimethylsilyl derivative; steric hinderance prevents a denser coverage of the surface. Thus a significant portion of the original silanol groups are left, and these interact with silanophilic analytes during chromatographic separations.

A useful solution to this problem of the residual silanol groups interacting with the analytes is to saturate the residual silanols with another silanophile added as a component of the mobile phase. By choosing the appropriate base additive, sharply eluting bands can be obtained for such analytes. Similarly, a cetyltrimethylammonium bromide can be used under certain conditions in a reversed-phase mode even with unmodified silica gel. In this case the adsorption of the silanophilic "head", the quaternary amine, forms a reversed-phase layer of its lipophilic "tail", thus becoming a competing reagent and a lipophilic layer at the same time.

A more permanent solution to the problem is encapsulation of the silica support. Nonpolar linear polymers may be adsorbed onto the silica surface, followed by gamma-ray irradiation to initiate crosslinking. This yields a permanent, nonextractable coating. Such encapsulated silica or alumina supports show high efficiency and resolution for basic silanophilic compounds. Shiseido Company of Japan held encapsulation to be responsible for the superior resolution they report having observed for basic amino analytes on its S/S-C18 reversed-phase packing. Thus covering the surface of the silica gel, in the first case by a nonbonded polymeric network, and in the second case by a bonded polymeric network, can prevent the deleterious effect of the residual silanol groups.

Glajch et al., in U.S. Pat. No. 4,705,725, disclose development of sterically protected, bonded organosilanes to prevent residual silanols from interacting with silanophilic analytes, as for example in $-Si(i\text{-}Pr)_2R$, where the two bulky isopropyl (i-Pr) residues render the residual silanols less accessible to such analytes.

Also known to those skilled in the art is that on highly polar, bonded silica-based phases, such as propylamino and propylcyano phases, good peak shapes and efficiencies for separations of silanophiles may be obtained. These polar phases consist of silica gel modified with 3-amino or 3-cyanopropyltrimethoxysilane. By shortening the alkyl chain of the bonded ligand, the lipophilic character of the supports diminishes and its polar character, including the contribution from the underlying silanol groups, predominates. Because of competitive interactions of the bonded polar groups with the silanols and the high polarity of the phase, the otherwise sluggish adsorption/desorption kinetics of the basic analytes is enhanced. Similarly, very polar polymers strongly adsorbed onto the silica surface, such as polyethyleneimine crosslinked with an organic diepoxide and partially modified with short-chain acids, also show good chromatographic efficiency for basic compounds. These polymers encapsulate and deactivate the silanols through the basic nitrogens of the network.

Modification of bonded $\gamma$-aminopropyl groups by acyl chlorides, active esters, or isocyanates is well documented, as is modification of 3-aminopropyltrialkoxysilane, followed by bonding of the resulting modified product to a silica gel support. Such modifications were done primarily as a convenient synthetic tool to functionalize a bonded silica surface, as for example, to prepare a chiral stationary phase, a $\pi-\pi$ complexing surface, and the like, or when the alternative synthetic route to a product via hydrosilylation of an olefinic intermediate was difficult. The only disclosure known to the applicant of studying reversed-phase acylations was by Nomura et al (*Analytical Sciences*, Vol. 3(1987), pages 209-212), and was intended to determine the effect of the molecular size of the acylating reagents on acylation of aminopropyl ligands bonded to silica gels having different pore diameters.

SUMMARY OF THE INVENTION

I have discovered a silica gel support, the surface of which is modified with $(R^3O)_{3-m}Si\ R^1_m(CH_2)_3NH(CH_2CH_2NH)_nH$, in which $R^3$ is a $C_1$-$C_5$ alkyl, $R^1$ is methyl or ethyl, and m and n are independently selected from the integers 0, 1 or 2, the resulting amino-modified silica gel being further modified chemically to produce the reverse-phase character. In such a support, the interaction between the silanophilic analytes and the surface silanol groups is markedly reduced by the presence of the polar groups which include the residual unmodified amino and modified amino groups, and which are densely packed near the silica surface. This results in elution of basic, silanophilic analytes in efficient, narrow bands similar to those of the less-polar analytes. I have further discovered a process for preparing these silica supports, and a liquid-chromatographic process for separating mixtures of silanophilic analytes using chromatographic columns packed with these silica supports.

DETAILED DESCRIPTION OF THE INVENTION

Figure 1:
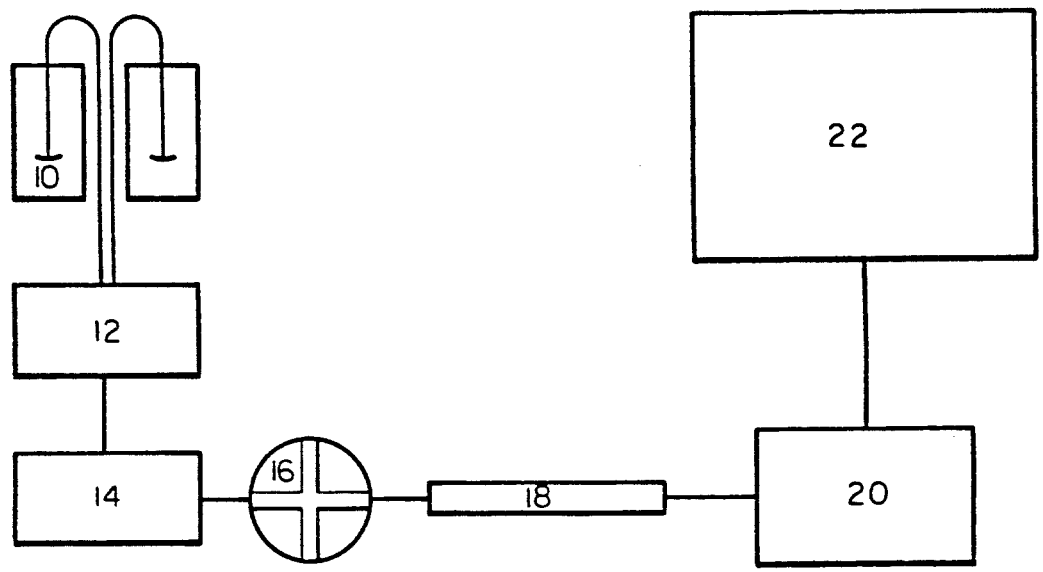

A brief description of the figures follows:

FIG. 1 schematically illustrates a typical liquid-chromatographic separation apparatus that consists of a solvent reservoir (10), a pump (12), a mixer (14), a sample injector (16), a chromatographic column (18), a detector (20) and a recorder or data-collecting means (22). The column (18) contains the deactivated reversed-phase packing used for chromatographic separation.

Figure 2:
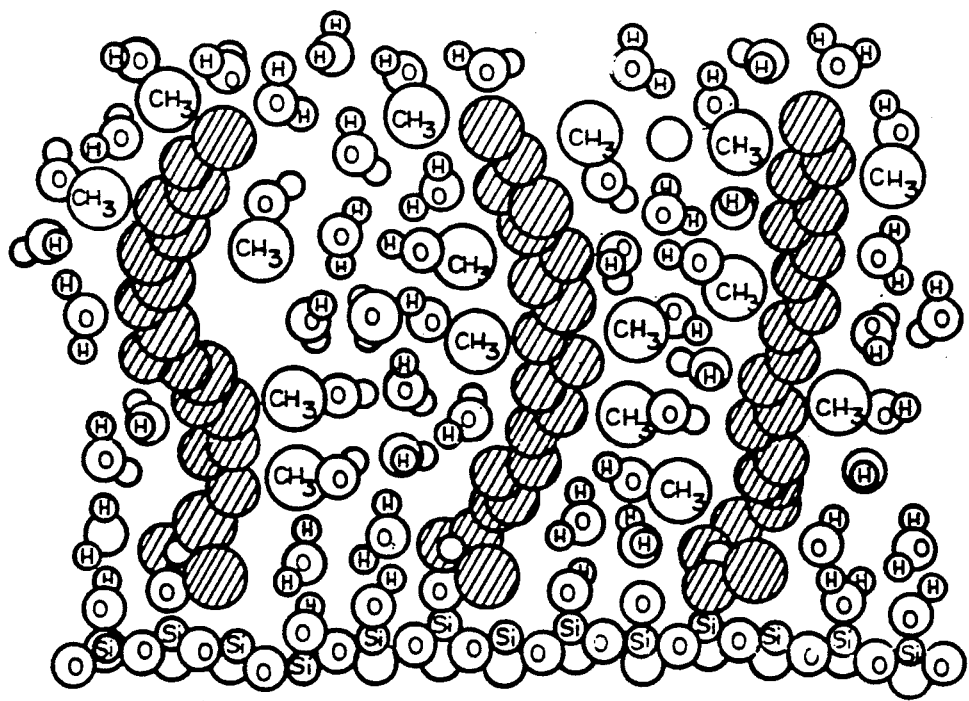
Figure 3:
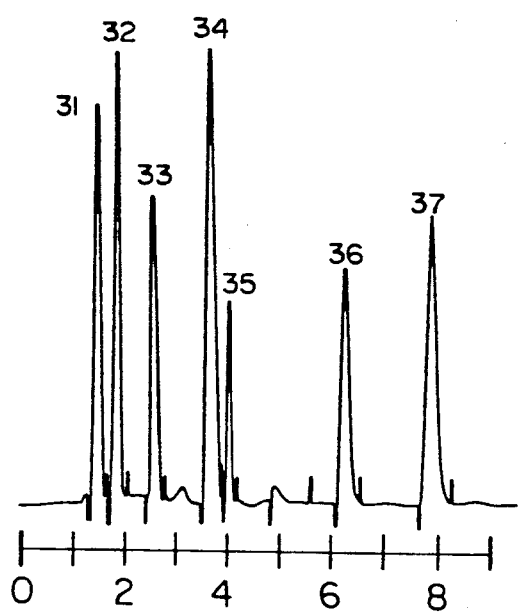
Figure 4:
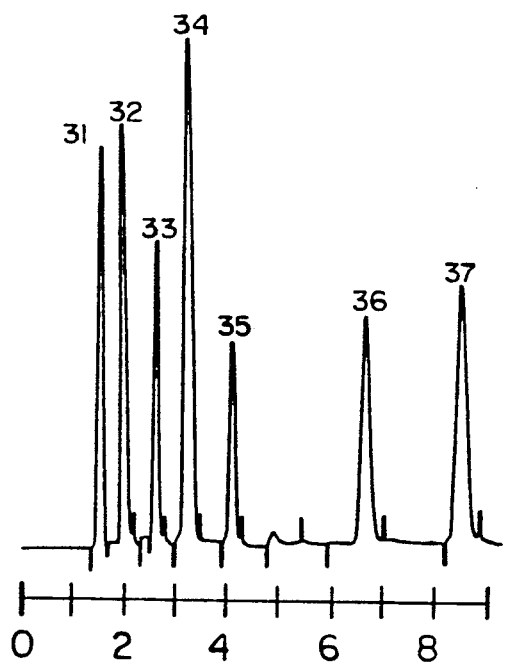
Figure 5:
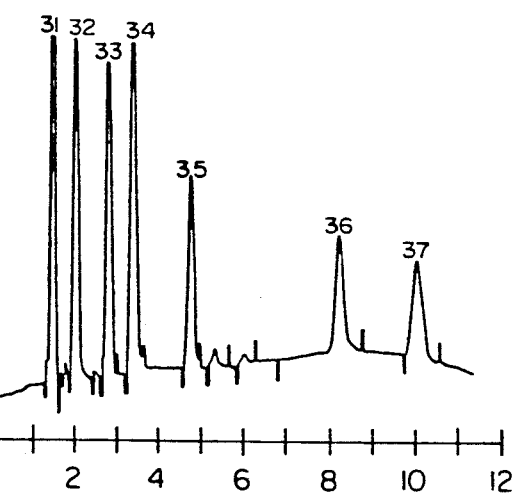
Figure 6:
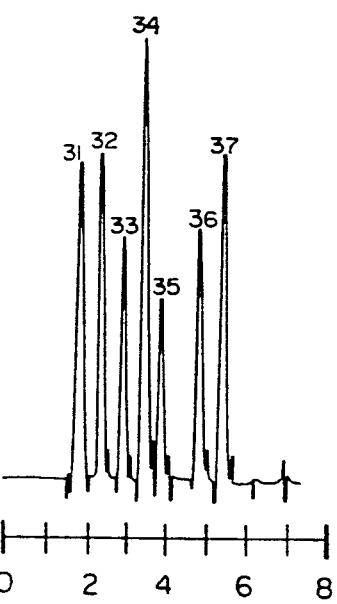
Figure 7:
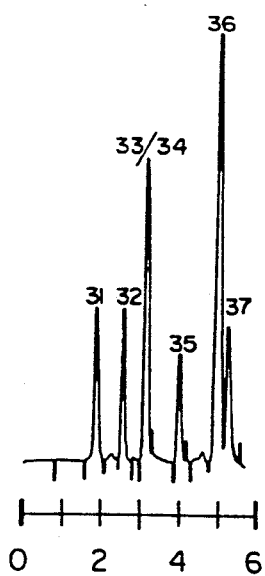

FIG. 2 schematically represents a regular $C_{18}$ silica bonded phase in which the octadecyldimethylsilyl residue ligands modify about half of the surface silanols. The shaded spheres represent methyl and methylene residues of these ligands. The slightly larger spheres are those of the methyl groups. Residual surface silanols are represented at a density of about half the original.

FIGS. 3 through 7 show liquid chromatograms of a test mixture of pyridine (32), aniline (33), dimethylaniline (36), phenol (34), and toluene (37) obtained on the phases described below as phase 1, phase 2, phase 3 phase 4 and phase 5, respectively, packed into 0.46-centimeter-diameter×15-centimeter-long, stainless-steel columns represented by (18) in FIG. 1. Using a mobile phase of 40:60 acetonitrile:0.1M aqueous ammonium chloride solution adjusted to pH 7.5 with aqueous potassium hydroxide solution, the sharply eluting bands represent the effect of phases of the present invention on the separation of the organic bases and phenol. Toluene was added to the mixture as a reference material.

As may be seen from FIG. 2, the dimethyloctadecylsilyl surface contains about 1.9 $nm^{-2}$ residues, which is equivalent to about 3.2 $\mu mole/m^2$. Assuming a cross section of 0.24 $nm^2$ per methylene chain, such a bonding should leave slightly more than half of the stagnant ligand space available to components of the mobile phase. These chains could also physically aggregate to open up spaces between them, making the silanol groups even more accessible to silanophiles. Once adsorbed, the silanophiles are sluggishly desorbed from these sites, being released into the mobile phase gradually, to produce "tailing" of the chromatogram peaks, or even causing the peaks to disappear altogether from the chromatogram.

When a trifunctional aminosilylating reagent, $(CH_3O)_3SiR$, where R is the amino-containing residue, is employed in place of the dimethyloctadecylsilyl surface-modifying agent, a mixture of silane-surface attachments take place. These attachments are influenced, on the one hand, by the existence of more than a single kind of silanol species on the silica surface, as for example a free silanol (isolated), an associated silanol (vicinal), or a geminal silanol. On the other hand, the trifunctional silane can be attached to the surface by a mono-, bis-, or tris-siloxane bond. The unreacted methoxy groups, when hydrolyzed to a free silanol, might react further with additional reagent, forming a second layer. For simplicity this combination of attachments is designated as (S)≡SiR, where (S) is the silica surface, and the triple line, ≡, represents all the above possible linkages.

The trifunctional aminosilylating reagent is allowed to react with the silica surface at levels of from about 2 to about 10 $\mu$mole of reagent per square meter of silica surface, preferably from about 3 to about 6 $\mu mole/m^2$. These levels provide adequate shielding of the silica surface from the silanophiles.

After preparation of the amino-bonded phase, the final phase is prepared using a second modification. The preferred second modification introduces an alkyl, aryl, alkylated aryl, carboxyalkyl, carboxyaryl, carboxyalkylaryl, sulfoxyalkyl, sulfoxyaryl, alkyl carbamate or aryl carbamate group onto the amino fragment of the aminosilyl group. Especially preferred as the group introduced by the second modification are alkyl, aryl and alkylated aryl. To introduce these groups the aminosilylated surface of the support is reacted with such reagents as acylating, sulfonating, sulfamidating, carbamylating, and alkylating reagents, preferably in an aprotic polar suspending solvent. Where acids are produced in the reaction, it may also be carried out in the presence of a scavenger for the acids. The reactions are preferably conducted at room temperature, but elevated temperatures, up to the boiling temperature of the lowest-boiling component of the reaction mixture, may be employed. The reagents and reactions used for this second modification are well known to those skilled in the art. Preferred acylating agents are acyl halides, acyl anhydrides and acyl esters; preferred sulfonating agents are sulfonyl halides; preferred carbamylating agents are isocyanates and preferred alkylating agents are alkyl halides and epoxies. In these reagents the group to be introduced is attached to the reactive group of the reagent, as is well known to those skilled in the art.

The alkyl groups and alkyl portion of the carboxyalkyl and alkyl carbamate groups may contain from 4 to 22 carbon atoms, as for example $-(CH_2)_2CH_3$, $-(CH_2)_4CH_3$, $-(CH_2)_6CH_3$, $-(CH_2)_{10}CH_3$, $-(CH_2)_{14}CH_3$, $-(CH_2)_{18}CH_3$ and the like. The alkyl portion of the sulfoxyalkyl group may contain from about 3 to about 19 carbon atoms, where the substituents on the sulfoxy group may be exemplified by the substituents exemplified on the carboyl groups above. The carboxyaryl and sulfoxyaryl groups may contain a phenyl group substituted with from 1 to 16 alkyl carbons, as for example—$\phi$—$CH_3$, —$\phi$—$CH_2$—$CH_3$, —$\phi$—$(CH_2)_2$—$CH_3$ and the like, where $\phi$ represents a phenyl group.

The resulting surface modification of the silica gel support is represented by the formula $-SiR^1_m(CH_2)_3NH(CH_2CH_2NH)_n-R^2$, in which $R^1$ is methyl or ethyl, m and n are independently selected from the integers 0, 1 or 2, and $R^2$ is the group which produces the reverse-phase character in the modified aminosilyl group. The description of $R^2$ is set forth above.

As the steric hindrance limits the density of this modification, some of the amino groups are left unmodified. Moreover, when the silyl reagent is a bis- or tris-functional base, each of the amino groups could undergo modification. Again for simplicity, the attachment is described as if only the terminal primary amino group is undergoing the modification.

The phases described herein are represented as follows:

| | |
|---|---|
| (S)≡Si(CH$_2$)$_3$NH(CH$_2$)$_2$NHCO(CH$_2$)$_{14}$CH$_3$ | Phase 1 |
| (S)≡Si(CH$_2$)$_3$NHCO(CH$_2$)$_{14}$CH$_3$ | Phase 2 |
| (S)≡Si(CH$_2$)$_3$NHCONH(CH$_2$)$_{17}$CH$_3$ | Phase 3 |
| (S)≡Si(CH$_2$)$_3$NHCO(CH$_2$)$_{14}$CH$_3$ | Phase 4 |

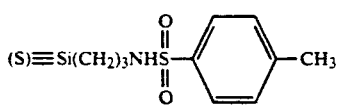

Phase 5

The following examples are intended to illustrate the present invention, and not to limit it except as it is limited in the claims. All proportions and percentages are by weight unless otherwise noted, and all reagents are of good commercial quality unless otherwise noted.

EXAMPLE 1

This example illustrates the preparation of the 3-aminopropyl bonded silica from which specific phases were prepared. A 5-$\mu$m particle-size silica gel was allowed to equilibrate in a desiccator for one week over a saturated aqueous solution of lithium chloride. A 10-gram sample of the equilibrated silica gel was suspended in 100 ml of toluene, and 2.50 g of 3-aminopropyltrimethyoxysilane (a calculated equivalent of 8.2 $\mu$mole of reagent per square meter of silica surface) was added. The suspension was slurried and refluxed for four hours, then cooled to room temperature, filtered, and washed well with toluene, methylene chloride, and methanol. The resulting solid material was dried in an oven at 80° C., under a nitrogen purge for four hours, and then under vacuum for two hours. The elemental analysis is shown in Table I under "Sample 6".

EXAMPLE 2

N-(2-Aminoethyl)-3-aminopropyl bonded silica was prepared using the procedure of Example 1, except that 3.02 grams of N-(2-aminoethyl)-3-aminopropyltrimethyoxysilane was used instead of the 2.50 g of 3-aminopropyltrimethoxysilane. The elemental analysis of this material is shown in Table I under "Sample 7".

EXAMPLE 3

This example illustrates preparing Phase 1, described above. To 5.50 g dry N-(2-aminoethyl)-3-aminopropyl bonded silica suspended in 50 ml methylene chloride in a 100 ml bottle, 1.94 g of palmitoyl chloride and 0.86 g of dry 4-dimethylaminopyridine (each equivalent to 8 $\mu$mole of reagent per square meter of bonded surface) were added. The bottle was closed and agitated at ambient temperature overnight. The resulting mixture was filtered and the silica was washed well with methylene chloride followed by methanol. The silica was dried in an oven at 80° C., under a nitrogen purge for four hours, and then under vacuum for two hours. The elemental analysis of the resulting silica is shown in Table I, below.

EXAMPLES 4-7

These examples illustrate preparing Phases 2-5, described above. For each phase the procedure of Example 3 was used, with the following exceptions:

Example 4 (Phase 2): 3-aminopropyl bonded silica was used in place of the N-(2-aminoethyl)-3-aminopropyl bonded silica of Example 3.

Example 5 (Phase 3): 3-aminopropyl bonded silica was used, and 5 ml of octadecylisocyanate replaced the palmitoyl chloride and 4-dimethylaminopyridine. A chloroform wash was added between the methylene chloride and methanol washes.

Example 6 (Phase 4): 3-aminopropyl bonded silica was used, and 1.0 ml of hexanoyl chloride replaced the palmitoyl chloride.

Example 7 (Phase 5): 3-aminopropyl bonded silica was used, and 1.35 g of p-toluenesulfonyl chloride replaced the palmitoyl chloride.

Table I, summarizes the elemental analyses of Phases 1-5 and the 3-aminopropyl and N-(2-aminoethyl)-3-aminopropyl bonded silicas. In those cases where additional batches of the same packing were prepared, the number of additional batches is indicated in parentheses, e.g., Phase 1(2) indicates the second batch of Phase 1. From the nitrogen analysis of samples 6 and 7 the degree of coverage of the silica surface by the ligand bonded to that surface was calculated as $(S)\equiv Si(OCH_3)R$. From the difference in carbon analysis before and after the treatment of the present invention, the coverage of the modified amino groups in the treated materials was calculated (except for Phase 5, in which the sulfur content was the reference). The limiting factor in the accuracy of these calculations is the accuracy of the analytical results, particularly in cases where nitrogen-containing compounds could contaminate the silica surface. In the elemental analysis columns of Table I, the duplicate values indicate the results of two elemental-analysis determinations on a single sample.

TABLE I

| SAMPLE | SILICA LOT | SURFACE AREA m²/gr | ELEMENTAL ANALYSIS | | | | SURFACE COVERAGE $\mu$mole/m² |
|---|---|---|---|---|---|---|---|
| | | | % C | | % N | | |
| — | a | 166.9 | 0.71 | 0.69 | 0.0. | 0.0 | — |
| — | b | 164.0 | 0.38. | 0.31 | 0.14. | 0.13 | — |
| — | c | 163.4 | — | — | — | — | — |
| 6 (1) | c | | 3.36. | 3.32 | 1.18 | | 5.58 (N) |
| 6 (2) | c | | 3.49 | 3.40 | 1.20 | | 5.75 (N) |
| 7 (1) | a | | 5.60. | 5.55 | 2.10 | 2.09 | 5.08 (N) |
| 7 (2) | b | | 5.41 | 5.39 | 2.10 | 2.06 | 4.75 (N) |
| 7 (3) | b | | 5.35 | 5.31 | 2.10 | 2.09 | 4.81 (N) |
| 1 (1) | 7 (1)* | | 15.36 | 15.30 | 1.69 | 1.69 | 3.93 ($\Delta C$) |
| 1 (2) | 7 (2)* | | 15.67 | 15.58 | 1.86 | 1.85 | 4.19 ($\Delta C$) |
| 1 (3) | 7 (3)* | | 15.72 | 15.69 | 1.78 | 1.79 | 4.25 ($\Delta C$) |
| 2 | 6 (1) | | 12.91 | 12.86 | 1.02 | 0.98 | 3.72 ($\Delta C$) |
| 3 | 6 (2)* | | 13.67 | 13.58 | 1.49 | 1.47 | 3.54 ($\Delta C$) |
| 4 | 6 (2)* | | 7.18 | 7.14 | 1.00 | 0.96 | 3.65 ($\Delta C$) |
| 5 | 6 (2)* | | 7.03 | 6.97 | 0.92 (% S-1.41) | | 3.17 (S) |

*The material used for the modification.
**(N), ($\Delta C$), and (S) are the % N, difference in % C and % S used for the calculation.

I claim:

1. A process for the preparation of silica gel support suitable for use in reverse-phase liquid chromatographic separations of silanophilic analytes which comprises the steps, carried out in order, of
   a. reacting a silica gel with 3-aminopropyltrimethyloxysilane as an aminosilylating reagent,
   b. reacting the resulting aminosilylated surface with palmitoyl chloride, and
   c. isolating from the reaction mixture a surface-modified silica gel having amino groups or modified amino groups or both densely packed near the silica surface and covalently bonded alkyl groups which impart a reverse-phase character to the silica gel, the silica gel providing a reverse-phase liquid chromatographic support in which interaction between silanophilic analytes and the silica surface is minimized.

2. The process of claim 1 wherein the second reagent is reacted with the aminosilylated surface in an aprotic, polar suspending solvent.

3. The process of claim 2 wherein the suspending solvent is methylene chloride.

4. The process of claim 2 wherein the second reagent is reacted with the aminosilylated surface in the presence of a scavenger for acid produced in the reaction.

5. The process of claim 2 wherein the scavenger is 4-dimethylaminopyridine.

6. The process of claim 1 wherein the silica gel is reacted with the aminosilylating reagent in the presence of a non-reactive solvent at elevated temperature.

7. The process of claim 6 wherein the non-reactive solvent is toluene and the elevated temperature is the reflux temperature of the toluene.

* * * * *